United States Patent
Green et al.

(10) Patent No.: US 7,202,637 B2
(45) Date of Patent: Apr. 10, 2007

(54) DISTRIBUTED CONTROL METHOD

(75) Inventors: Tim Charles Green, London (GB); Hassan Mansir, London (GB); Milan Prodanovic, London (GB)

(73) Assignee: The Turbo Genset Company Limited, West Drayton (GB)

( * ) Notice: Subject to any disclaimer, the term of this patent is extended or adjusted under 35 U.S.C. 154(b) by 162 days.

(21) Appl. No.: 10/332,317

(22) PCT Filed: Jul. 6, 2001

(86) PCT No.: PCT/GB01/03035

§ 371 (c)(1),
(2), (4) Date: Jul. 22, 2003

(87) PCT Pub. No.: WO02/05040

PCT Pub. Date: Jan. 17, 2002

(65) Prior Publication Data

US 2004/0037095 A1  Feb. 26, 2004

(30) Foreign Application Priority Data

Jul. 6, 2000  (GB) ................................ 0016667.8

(51) Int. Cl.
*H02P 9/04*  (2006.01)
*H02P 11/00*  (2006.01)
*H02P 11/06*  (2006.01)

(52) U.S. Cl. .............. 322/7; 322/14; 322/16; 322/17; 322/44; 322/46; 290/31; 307/82; 363/74

(58) Field of Classification Search .............. 322/44
See application file for complete search history.

(56) References Cited

U.S. PATENT DOCUMENTS

| | | | |
|---|---|---|---|
| 5,339,016 A | 8/1994 | Thoen | 318/610 |
| 5,561,330 A * | 10/1996 | Crook | 290/30 R |
| 5,652,485 A | 7/1997 | Spiegel et al. | 318/147 |
| 5,750,945 A | 5/1998 | Fuller et al. | 187/292 |
| 6,285,972 B1 * | 9/2001 | Barber | 703/8 |
| 6,552,917 B1 * | 4/2003 | Bourdillon | 363/21.12 |
| 6,969,025 B1 * | 11/2005 | Bugge et al. | 244/3.16 |

FOREIGN PATENT DOCUMENTS

| | | |
|---|---|---|
| EP | 0 657 997 A | 6/1995 |
| GB | 2023237 A | 12/1979 |
| GB | 2182788 A | 5/1987 |

* cited by examiner

*Primary Examiner*—Brian Sircus
*Assistant Examiner*—Hal I. Kaplan
(74) *Attorney, Agent, or Firm*—Gottlieb, Rackman & Reisman

(57) ABSTRACT

The present invention provides an improved control method and apparatus allowing units arranged at different spaced apart locations to be controlled without the need for a high bandwidth link between the units and the controller. This allows a single controller to control a number of remotely located units.

25 Claims, 8 Drawing Sheets

DISTRIBUTED CONTROL METHOD

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

BACKGROUND OF THE INVENTION

The present invention relates to a control method for controlling both high frequency and low frequency transients of a controlled device, particularly in power generation systems.

Systems for use in controlling devices to operate according to predefined parameters are well known in many fields. The system in FIG. 1 represents a typical connection between a controller and a device being controlled. The output variable y is controlled by the controlling variable c*. This in turn is provided by a controller based upon a reference signal and a signal fed back from the controlled device. The reference signal is usually a DC or a low frequency signal. The purpose of the controller is to determine the required output c* based upon the difference between the reference signal $y_{REF}*$ and the feedback signal y. This type of controller is used in many applications, including power generation systems.

There are numerous applications which demand high power and high quality voltage generation, particularly three-phase voltage generation. More critical loads such as hospitals, banks, and communication centres have to use uninterruptible power supplies. Further, most of the electronic equipment in those systems is very sensitive not only to the changes in the voltage levels and frequency of the power supply system but also to harmonic distortion. Therefore, the use of diesel driven synchronous generators and similar power sources are limited for many applications because of the high harmonic content of the output voltage particularly when a non-linear load is applied.

One solution to these limitations is to use an inverter to generate high quality voltage within a system which controls the instantaneous voltage. There are many power sources that are naturally DC voltage sources but whose power has to be converted and exported via a three-phase voltage bus. However, inverters have a limited power capacity, and above a certain limit they suffer problems due to component availability, cost, physical limitations, heat dissipation and reliability. Thus, in order to expand the system total power capacity, a modular approach is used in which inverters are connected in parallel, sourcing the same load. The use of the modular approach increases system reliability and efficiency.

In use, there are various different types of load that may be applied to these systems. The most critical loads are unbalanced loads, rectifier loads and motor loads.

A small phase difference between parallel inverters may lead to circulating currents between modules, especially under fight load. This makes the synchronisation between the units an important part of the system development. Some of the methods use self-sychronisation, in other words they generate their reference phase using the three-phase voltage on the bus. An alternative is to use a separate communication link for this purpose.

Currently, there are two main control concepts for controlling a modular inverter system These are central mode control and master-slave control. A widely adopted approach to paralleling power modules is to use current mode control nested within a voltage control loop. The main control is based on the use of a single controller for the output voltage, which generates current references for all modules connected in parallel. This allows current sharing to be achieved.

The central mode control (CMC) method is derived from its DC-DC method equivalent central-limit control (CLC) and represents a variant of current-mode control. In this method, both the current and voltage controllers have an influence on the output current. All the inverter units operate as current sources, and there is a central control block, which controls the output voltage. The system for two power modules connected in parallel is represented in FIG. 2, where three functional parts can be recognised in each unit: a current controller Gc(s), a voltage source inverter (limiter), and an output filter $H_{LC}(s)$. This is a single-phase controller, and an equivalent model is used for the other phases.

There are two control loops in the system of FIG. 2: an overall voltage control loop and a local current control loop. The shared signals are the voltage error $v_E*$, and the current reference $i_s*$. The voltage error $v_E*$ generated by the voltage controller $G_v(s)$ based on the difference between the output voltage $v_o$ and the reference voltage $v_R*$, and the output signal $v_C*$ from the current controller $G_c(s)$ forms the inverter reference voltage $v_I*$. The output of the inverter is applied to a filter $H_{LC}(s)$ and the output is the current $i_s$. The unit currents are summed at the point of common coupling, where the load current $i_L$ and the output voltage $v_o$ are sensed.

The current sharing controller $W_c(s)$ is placed inside of the cent control block. Its main purpose is to maintain equivalent load share between the units. In a simple case it divides the output load current $i_L$, by the number n of converters. It can also be used for additional filtering, before sharing. In that way, it can be said that all converters connected in parallel act as a single current source.

The open loop transfer function for n converters connected in parallel, including differences between units, is given in (1). The index k refers to a corresponding transfer function of one of the units. $Z_L$ indicates the impedance of the load.

$$\frac{v_o}{v_R^o - v_o} = nG_v(s) \left[ \frac{\sum_{1}^{n} \frac{H_{LC}^k(s)}{1+H_{LC}^k(s)G_c^k(s)}}{\frac{1}{1+H_{LC}^k(s)G_c^k(s)}} \right] Z_L \quad (1)$$

-continued $$H_{LC}^k(s) = H_{LC}(s) \quad k = 1, 2, \ldots, n \quad (2)$$
$$G_C^k(s) = G_c(s)$$

$$\frac{v_o}{v_R^o - v_o} = nG_v(s)H_{LC}(s)Z_L \quad (3)$$

The function of the current controller Gc(s) is to keep the difference between the reference current $i_s^*$ and the output current of the unit $i_s$ small. The voltage controller $G_v(s)$ in the central control block maintains the output voltage $v_o$ by generating the voltage error signal $v_s^*$. In the case of identical modules, when condition (2) is met, the transfer function (1) can be amplified to the expression shown in (3). It can be seen that the transfer function (3) does not depend on the current controller transfer function $G_c(s)$. In other words, when the current sharing is ideal, the current controllers can be removed from FIG. 2 and the system can be represented as a parallel connected inverter system controlled from a single voltage controller $G_v(s)$. However, in a real system, the current controllers help to equalise the output currents of the modules. With the CMC method, the current sharing is forced at all times, including during transients. During transients, the system will try to recover the output voltage using both voltage and current control loops: the voltage loop will try to recover the voltage by setting new current values, while the current loop will try to meet new current demands.

Both the $v_E^*$ and $i_s^*$ are AC signals and have to be distributed to all of the converters using a high bandwidth link, which is the main disadvantage of this method. The control is performed in a stationary reference fine and the control variable is not a DC value, but an AC signal, at the fundamental frequency (50 or 60 Hz), which makes the control system sensitive to non-linear loads in terms of stability.

As for master-slave control methods (MSC), in the first configuration (MS1), one of the inverters operates in voltage control mode (the master) and all the others (the slaves) operate in current-mode control. The system represented in FIG. 3 consists of one master and one slave unit connected in parallel. This Figure represents a single phase of the system. The other phases can be controlled in the same way, since there are no interactions between the phase variables.

The output voltage $v_o$ of the system is controlled from the master unit, where the voltage controller $G_v(s)$ is located. The shared signals are the voltage error $v_E^*$ and the slave curt reference $i_s^*$ which is equivalent to the master unit current $i_M$. The master inverter unit is directly fed by the voltage error $v_E^*$ whereas in the slave inverter units voltages $v_I^*$ are generated from the voltage error signal $v_E^*$ and the output signals $v_c^*$ from the current controllers $G_c(s)$. The function of the current controller $G_c(s)$ is to decrease the difference between the reference master current $i_M$ and the output current of the slave $i_s$. The output currents from the master and slave units, $i_M$ and $i_s$ respectively, are obtained from the filter blocks $H_{LC}(s)$. The output currents are summed at the point of interconnection, where the output voltage $v_o$ is sensed.

The open loop transfer function for n converters connected in parallel using this method, including differences between the units, is given in (4). The index k refers to a corresponding transfer function of the slave unit, and the index M refers to the master unit.

$$\frac{v_o}{v_R^o - v_o} = G_v(s)\left[H_{LC}^M(s) + \sum_{2}^{n} \frac{H_{LC}^k(s)(1 + H_{LC}^M(s)G_c^k(s))}{1 + H_{LC}^k(s)G_c^k(s)}\right]Z_L \quad (4)$$

$$H_{LC}^k(s) = H_{LC}^M(s) = H_{LC}(s) \quad k = 2, \ldots, n \quad (5)$$
$$G_c^k(s) = G_c(s)$$

$$\frac{v_o}{v_R^o - v_o} = nG_v(s)H_{LC}(s)Z_L \quad (6)$$

In the case of identical inverters (5), the transfer function (4) can be simplified to expression (6) which is equivalent to the CMC method shown in (3). The transfer function does not depend on the current controller transfer function $G_c(s)$ and the system can be represented as a parallel connected inverter system controlled from a single voltage controller $G_v(s)$.

In this method the current sharing is forced in steady state but during transients there will be some differences between the master unit current and slave unit currents. The advantage of this control method is that the system will try to recover the output voltage during the transients by using both control loops, voltage and current. Non-identical modules can be connected to this system and the equivalent current distribution will be forced. However, an additional block will be necessary.

As in the CMC method, there is the disadvantage that signals error $v_E^*$ and $i_s^*$ have to be distributed to all converters using a high bandwidth link. The control is performed in a stationary reference frame and again the control variable is an AC signal at the fundamental frequency (50 or 60 Hz). Although the current distribution is forced to be equal in steady state, the master unit takes most of the load current during transients.

In a second arrangement of the master-slave control method (MS2), similarly to the first arrangement, one of the inverters operates in the voltage control mode (the master) and all the others (the slaves) operate in current-mode control. A basic system structure representing one phase is shown in FIG. 4.

There is only one shared signal between the converters in this method, the slave reference current $i_s^*$, which is supplied to each of the slave units. The current sharing weighting function $W_C(s)$ generates this signal from the measured load current $i_L$ by dividing it by the number of converters connected in the system. The output voltage $v_o$ of the system is controlled from the master unit, using voltage controller $G_v(s)$, and the slave units provide the current demanded by the load. The role of the current controller $G_C(s)$ is to decrease the difference between the slave reference current $i_s^*$ and the output current of the slave $i_s$. The output currents $i_M$ and $i_s$ are summed at the point of common coupling, where the output voltage $v_o$ is sensed by the master unit and the load current $i_L$ sensed by the central control block.

The open loop transfer function for n converters connected in parallel using this second arrangement, is given in (7).

$$\frac{v_o}{v_R^o - v_o} = (n-1)G_v(s) \left[ \frac{\frac{H_{LC}^M(s)}{1 + H_{LC}^k(s)G_c^k(s)}}{\sum_2^n \frac{n}{1 + H_{LC}^k(s)G_c^k(s)}} \right] Z_L \quad (7)$$

$$\frac{v_o}{v_R^o - v_o} = G_v(s)H_{LC}(s) \left[ \frac{1 + H_{LC}(s)G_c(s)}{1 + \frac{H_{LC}(s)G_c(s)}{n}} \right] Z_L \quad (8)$$

In the case of identical modules the transfer function (7) can be derived to expression (8). The transfer function (8) is dependent on the current controller transfer function $G_c(s)$, and is not linearly proportional to the number of converters n in the system.

In this arrangement of the control method the current sharing is forced by the current controllers at steady state, but during transients the master unit current and the slave unit currents will differ. The system will try to recover the output voltage during transients by the voltage control loop inside the master controller, which leads-to large changes of the master unit current. Non-identical modules and different power range modules can be connected to this system and the proportional current distribution can be achieved.

Only one signal $i_s^*$ has to be distributed to the slave converters which is an improvement over the CMC method and the first arrangement of the master slave method, but the requirement for the high bandwidth link still remains. The advantage is that no synchronisation link between the units is necessary, since they can be synchronised to the existing output voltage. The control is performed in the stationary reference frame and the control variable is an AC signal at the fundamental frequency, which makes the control system sensitive to some non-linear loads in terms of stability.

The limitation of the CMC, MS1 and MS2 methods is due to control in the (abc) stationary reference frame which makes the reference signals all AC, requiring a high bandwidth communication link.

The present invention provides an alternative way of controlling distributed resources while requiring low bandwidth communication links.

BRIEF SUMMARY OF THE INVENTION

Therefore, according to the present invention there is provided a control system comprising:
a low frequency controller,
a high frequency controller,
wherein, in use, a feedback signal from the device being controlled is input to the low frequency controller to produce a first control signal;
the feedback signal is also fed to the high frequency controller to produce a second control signal; and wherein
the first and second control signals are combined to provide a main control signal for the device being controlled.

The feedback signal may be passed through a filter, preferably a low pass filter, before being fed to the low frequency controller (i.e. the controller block for the low frequency component of the reference signal). The feedback signal is preferably subtracted from a reference signal, for indicating the desired output from the device being controlled, before being input to the low frequency controller. The low frequency controller is preferably responsive to low frequency components of the signal input to it so that high frequency components of the original signal and any noise picked up between the signal source and the controller do not affect the output reference signal. Similarly, the high frequency controller (i.e. the controller block for the high frequency component of the reference signal) is ideally only responsive to high frequency components of the signal input to it.

Whilst it is clearly not essential, the low frequency controller may be remote from the device being controlled and/or the high frequency controller. This allows the low frequency controller to control more than one device without the devices having to be located close to each other.

The low frequency controller may be a voltage controller for controlling devices where the output voltage need to be maintained according to specific parameters. Similarly, the high frequency controller may be a voltage controller. The system may further include a current controller for controlling the current.

The feedback signal may be a voltage signal produced by the device being controlled.

Whilst the present invention is applicable to general applications where a low frequency controller, separate from the controller equipment, is used, the present invention is particularly applicable to power generation applications where the power sources may need to be in more than one location and where it is difficult or inconvenient to provide a high bandwidth link necessary for maintaining accurate control of the output parameters of the overall system.

Therefore, the present invention further provides a power generation system comprising:
a main controller; and
one or more generator units for producing a regulated voltage output signal, each generator unit having a local controller associated with it,
wherein, in use, the a output signal is input to the main controller to produce a first control signal and also fed to the local controller to produce a second control signal; and wherein
the first and second control signals are combined to provide a main control signal for the device being controlled.

Reference to generator units or plant includes power converters such as inverters.

The output signal may be passed through a filter, preferably a low pass filter, before being fed to the main controller. As described above for the low frequency controller, the output signal may be subtracted from a reference signal before being input to the low frequency controller. The main controller is preferably only responsive to the low frequency components of the signal input to it and the local controller is preferably responsive only to the high frequency components of the signal input to it. Thus, the main controller can be used to control the lower frequency components such as the voltage output at for example 50 Hz whereas the local controller can deal with high frequency components such as transients in the output voltage. In this way the connection to the main controller need only communicate low frequency signals and so is not constrained to high transmission capability. This allows the main controller to be located remotely from the power generation unit.

Therefore, if the power generation plant is connected remotely from the main controller, only the DC/low frequency reference will need to be sent via the link, and the bandwidth requirement for this signal will be small compared to the conventional control schemes.

The present invention further provides a method of controlling a power generation system comprising:
- inputting the output signal from a generator;
- producing a first control signal based upon the output signal;
- producing a second control signal based upon the output signal;
- combining the first and second control signals to produce a main control signal; and
- controlling the generator using the main control signal.

For the same bandwidth, using the conventional and distributed control method (DCM) control structure, the average (low frequency) system response on the input reference signal $Y_{REF}$* change will be the same, but higher spectral components in DCM will be controlled (forced to zero). In order for the conventional method to achieve the same dynamic performance, the bandwidth would need to be higher.

This method can be used for the parallel connection of power inverters or converters, or any kind of actuators, which have a demand to maintain (or track) a low frequency reference signal with high quality of the output signal shape (less higher harmonics in the output signal).

The parallel connection of different plants (e.g. different power module ratings) can be achieved with minimal changes in the system structure.

The present invention provides: a system which requires lower communication bandwidth (for the same dynamic performance); control of high frequency spectral components; and simpler connection of plants connected in parallel. This allows easier paralleling of power modules (converters) to expand power capacity. This also provides the ability to control different types of actuators or plants (e.g. different power module ratings) with minimal changes in the system structure.

The present invention can be implemented either in hardware or on sole in a general purpose computer. Further the present invention can be implemented in a combination of hardware and software. The present invention can also be implemented by a single processing apparatus or a distributed network of processing apparatuses.

Since the present invention can be implemented by software, the present invention encompasses computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal.

BRIEF DESCRIPTION OF THE SEVERAL VIEWS OF THE DRAWINGS

A specific embodiment of the present invention will now be described with reference to the accompanying drawings in which.

Figure 1:
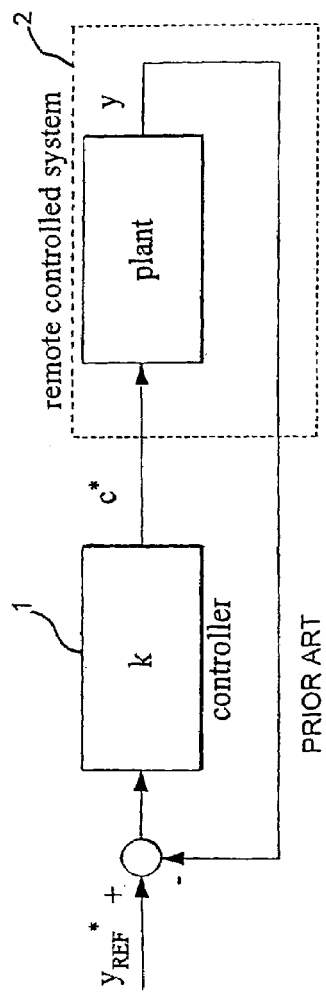
FIG. 1 shows conventional control structure.
Figure 2:
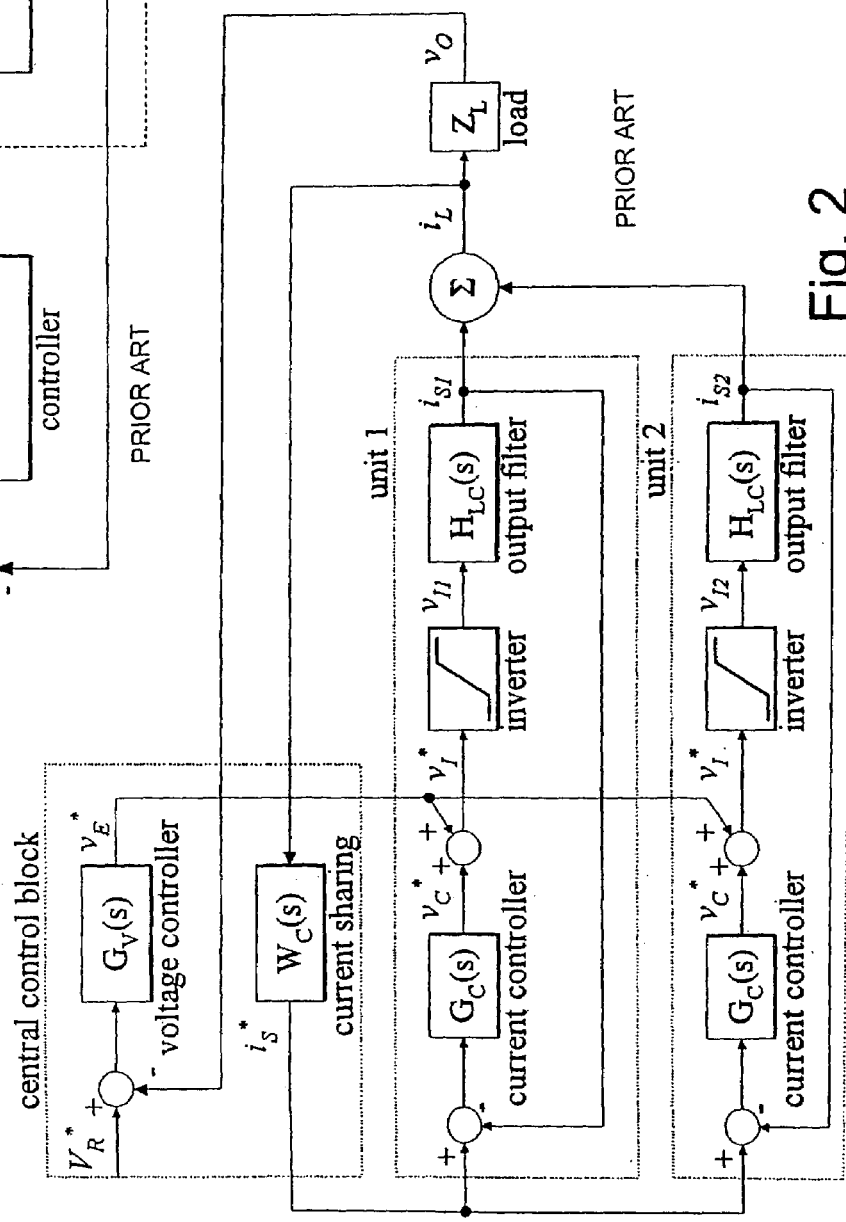
FIG. 2 shows a control diagram of the central mode control method.
Figure 3:
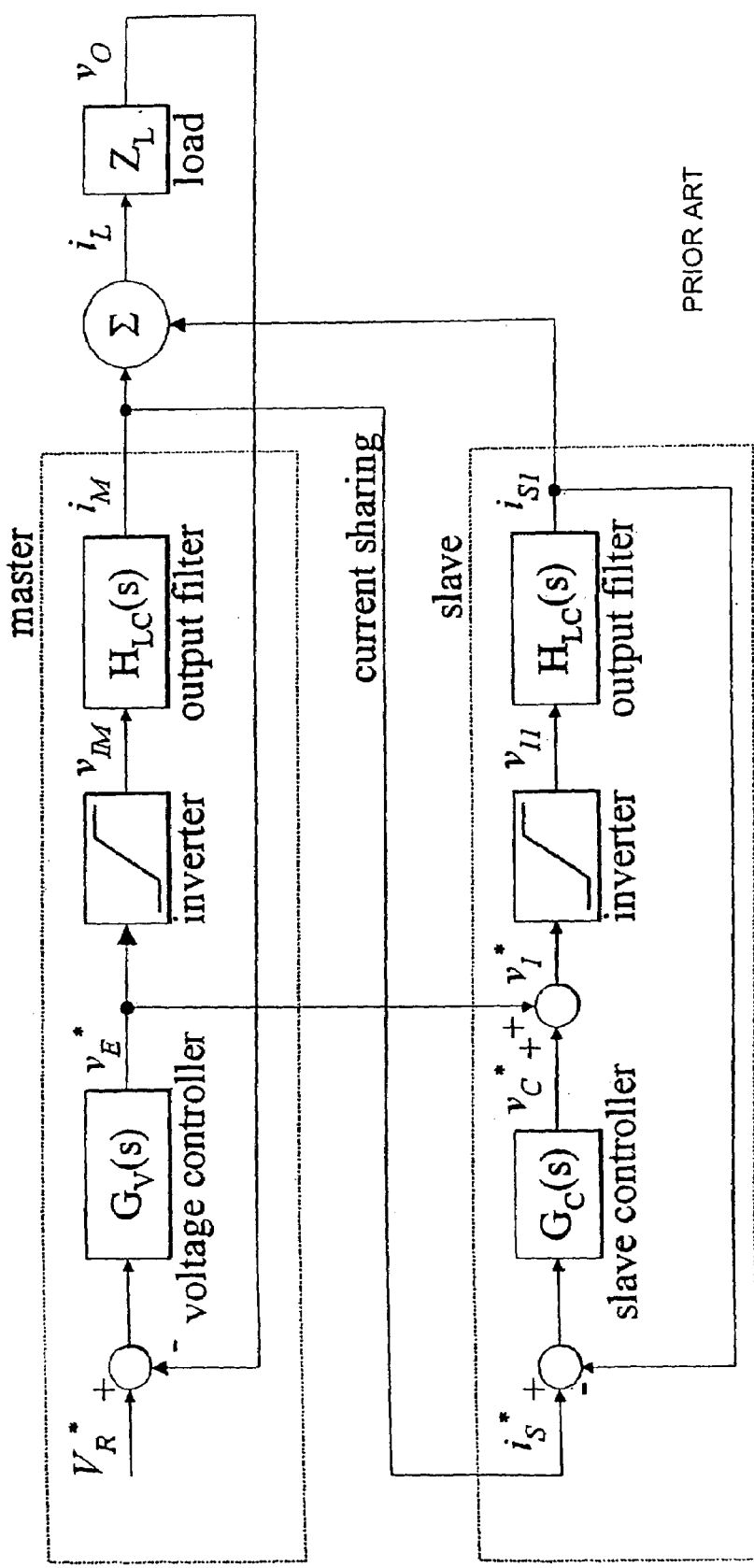
FIG. 3 shows a control diagram of a first arrangement of a conventional master slave control method.
Figure 4:
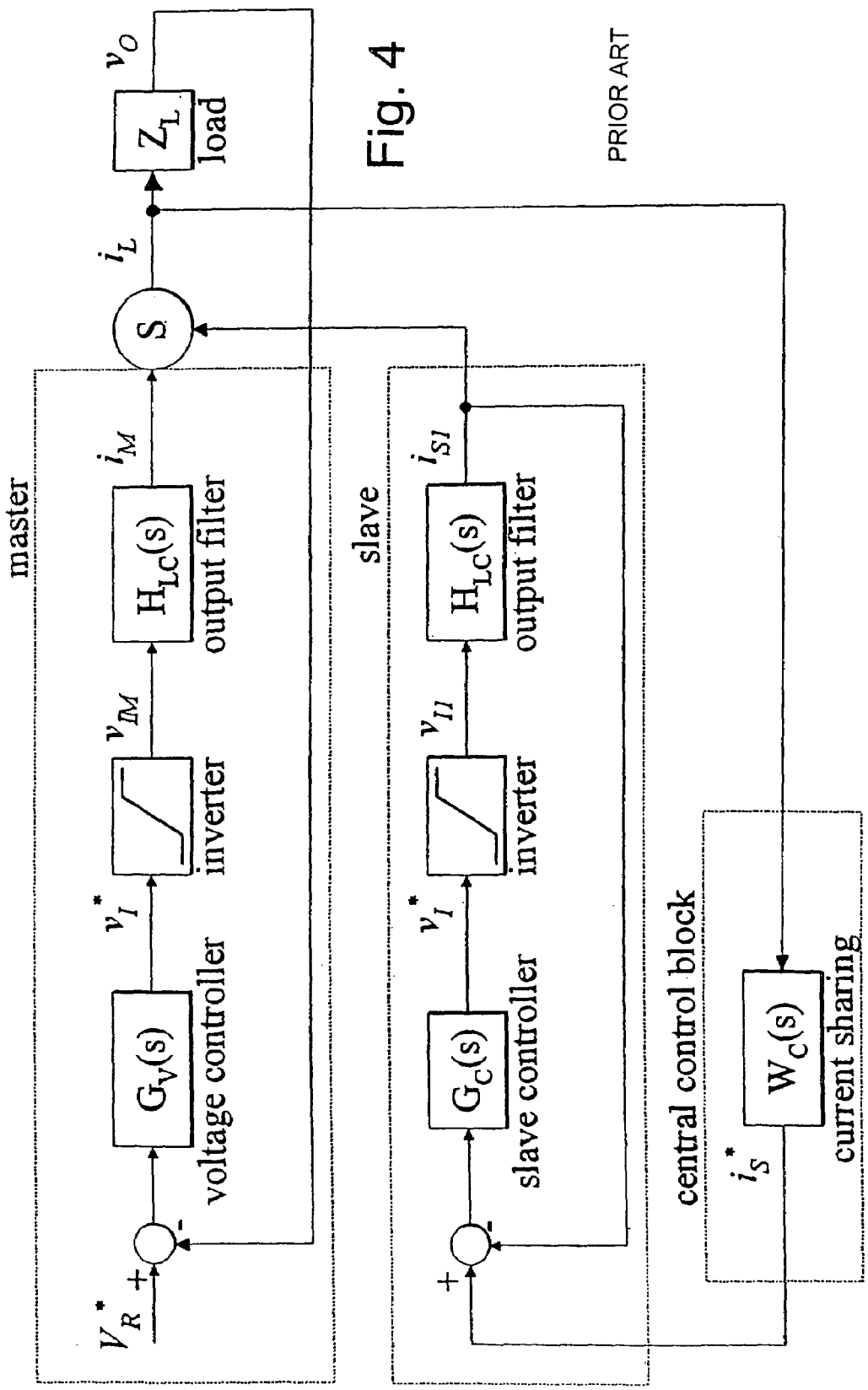
FIG. 4 shows a control diagram of a second arrangement of a conventional master slave control method.

The system in FIG. 1 represents a typical connection between a controller 1 and a controlled device 2, where the output variable y is controlled by the controlling variable c*. This system is a suitable control structure when the bandwidth of the link between the controller and device is high.

DETAILED DESCRIPTION OF THE INVENTION

In most applications, the controller is located close to the device. Under these circumstances, the bandwidth considerations of the link are not as important. However, where the device is connected remotely from the controller, the link bandwidth is significant. If the bandwidth is insufficient it will limit the closed-loop response of the system, and higher frequency components of the output signal will not be controlled.

Figure 5:
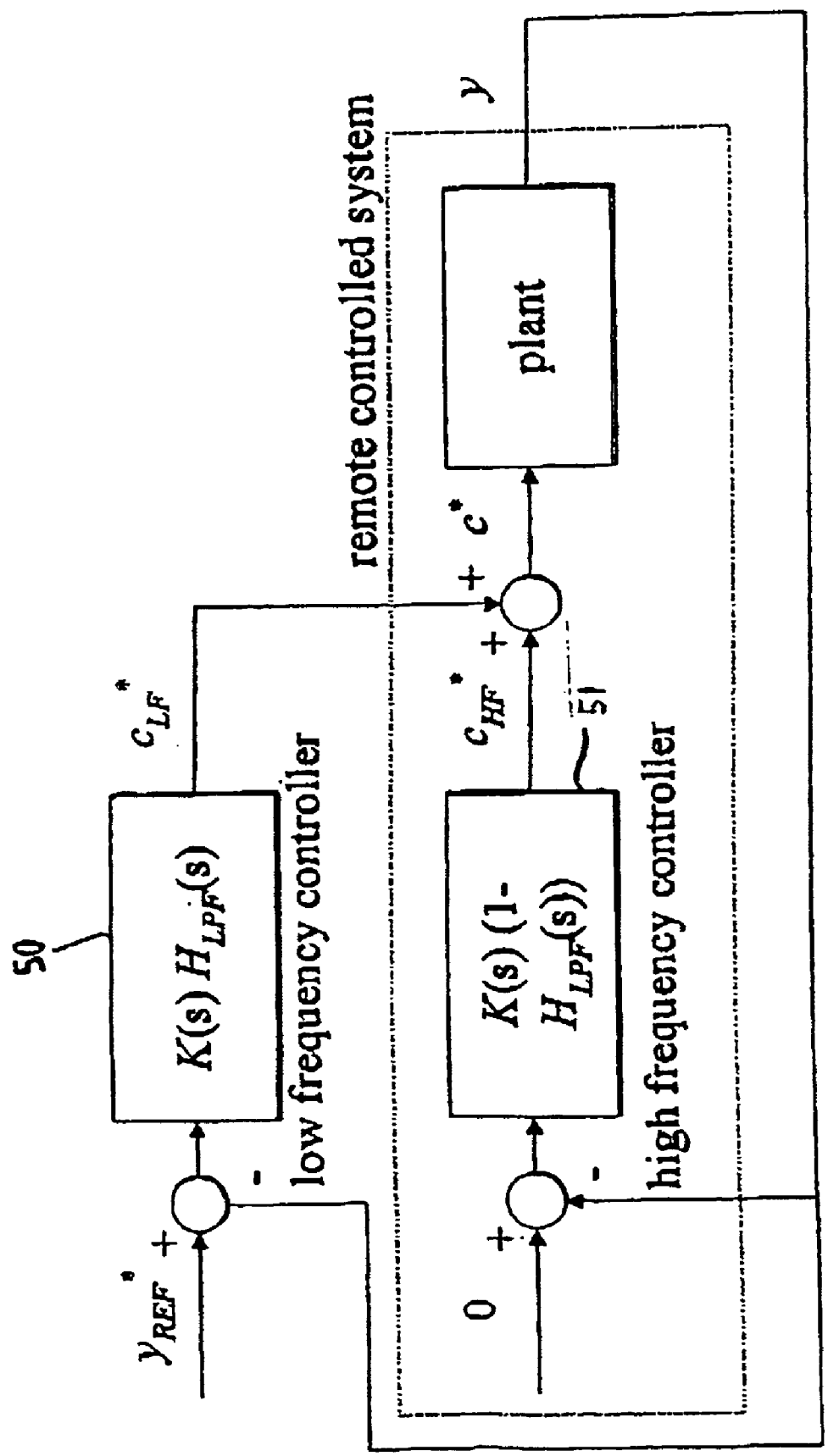
FIG. 5 shows a control diagram of the distributed control method of the present invention.

The system in FIG. 5 represents a new distributed control method (DCM), which is optimised for remote location of the controller from the device. The control spectrum is shared between two controllers: a low frequency controller 50 $K(s)H_{LPF}(s)$, and a high frequency controller 51 $K(s)(1-H_{LPF}(s))$. The low frequency controller 50 sets the low frequency (average) control reference $C_{LF}$* while the high frequency controller 51 sets a high frequency reference $C_{HF}$. The reference control signal c* is formed by adding low and high frequency references. The input reference signal for the higher frequency controller is 0, since only high frequency components or a.c. components should exist in the output spectrum of that controller.

It will be apparent from a comparison with the basic control method of FIG. 1 that the controller 1 (k) has been divided into two separate parts. A low frequency controller 50 is located away from the controlled system and a high frequency controller 51 is located close to the controlled system. In this way, only a low bandwidth signal $c_{LF}$* is required between the low frequency controller and the controlled system. This allows the low frequency controller to be located remotely from the controlled system without the need for a high bandwidth connection.

As with the basic control method shown in a FIG. 1, the low frequency controller is fed with an input reference signal $Y_{REF}$* which is compared to the output of the plant y. The high frequency controller is also fed with the output of the device y which, because there are no high frequency components required, is added to a zero reference signal before being fed to the high frequency controller. The outputs from the low frequency controller and the high frequency controller are summed to provide an overall control signal c* to control the device.

Although the output signal y from the device contains high frequency components, it is not necessary to relate these high frequency components to the low frequency controller as the low frequency controller is only sensitive to low frequency components of the signal. Therefore, it is not necessary to have a high frequency bandwidth communication link for transmitting the signal y to the low frequency controller.

The present invention is particularly applicable to the control of power generation systems where a number of separate power generation units are arranged at different locations throughout a site. For example, it may not be practical to house-all the power generation units in a single location. However, maintaining control of the output voltage requires a high bandwidth link between each of these power generation units. Where the power generation units are separated by a considerable distance then the provision of such a high frequency link represents a considerable drawback.

The specific embodiment of the present invention described in detail below provides a control system for controlling a number of distributed power generation units without the need for a high bandwidth link.

The distributed control method (DCM) of the present invention uses rotational reference frame variables (dq0) for control purposes instead of the stationary reference frame variables (abc) used in the central mode control and the two master-slave control methods described above. When a positive phase sequence transformation is applied to a balanced system, d, q and 0 voltage vector components have a dominant zero frequency component, and they can be considered constant. Thus it is the zero frequency component i.e. DC that provides the necessary information for the low frequency controller. If there is an unbalance or a negative phase sequence component in system voltages, then it will show in the d, q and 0 voltage components as a harmonic content. This means that only zero or very low frequency signals need to be communicated to the low frequency controller 50 over the link.

Figure 6:
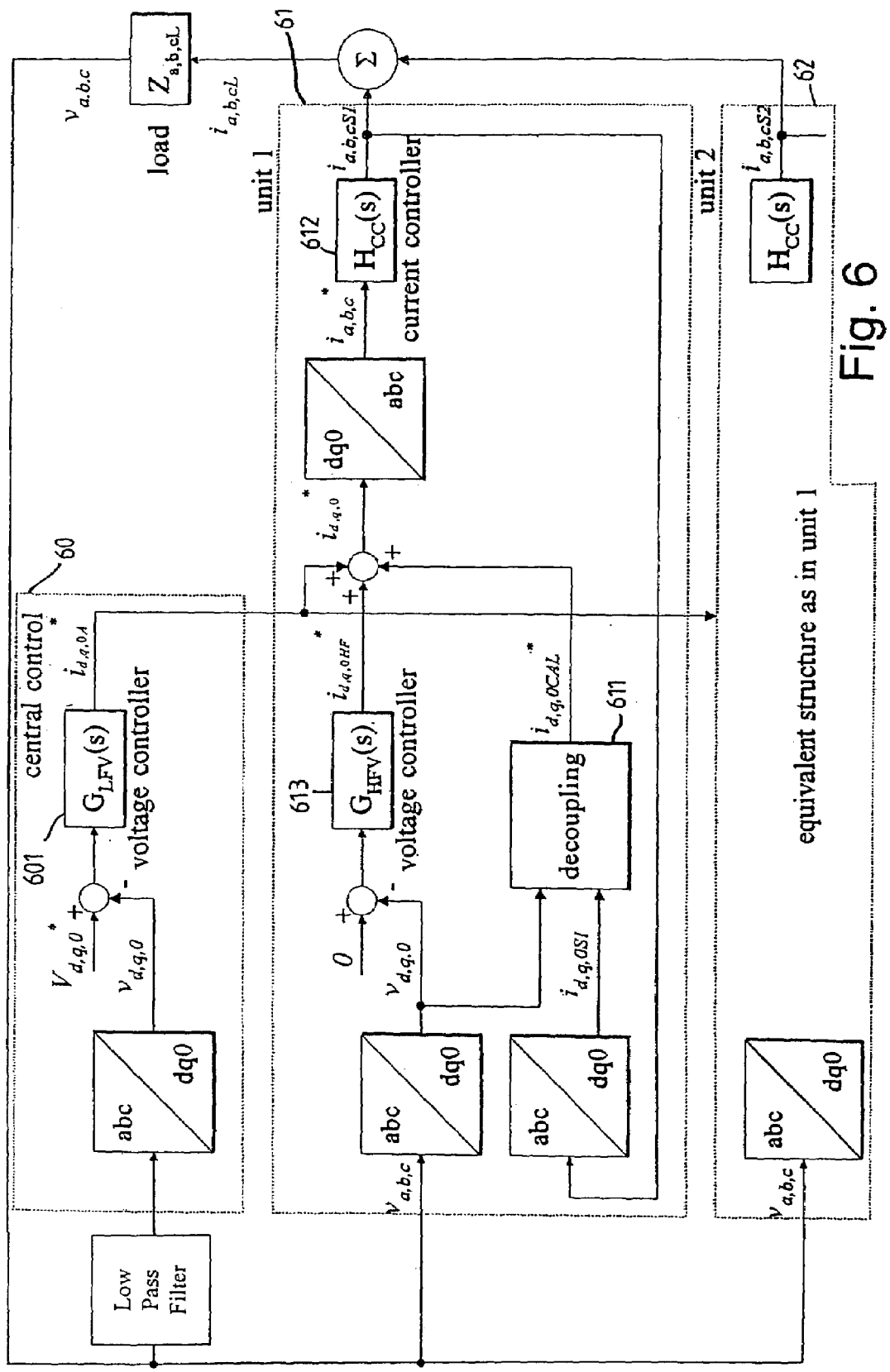
FIG. 6 shows a detailed control diagram of the distributed control method of the present invention applied to a power generation application.

This method is called distributed control because the overall control task is distributed between the controllers. There are several levels of control, and each part of the system has its own part of the output voltage spectrum to control. FIG. 6 shows a control system comprising two units 61, 62. The variables shown which refer to the stationary reference frame are presented with a,b,c index, and those which refer to the rotational reference frame with d,q,0 index The control system structure is equivalent for d, q and 0 reference frames, and therefore only a general diagram including all reference frames is represented.

The system consists of one central control block 60 and the converters 61, 62. Inside the control block there is an outer low frequency voltage controller 601 $G_{LFV}(s)$, which is mainly concerned with providing information about the output power for the converters. It controls the output voltages by setting the average current demands for the converters $i_{d,q,0AV}$ for d, q, and 0 output current components. The control loops inside each unit add the higher harmonic content of the output currents to the average demand. In this way, low frequency components of the output voltage $v_{a,b,c}$ converted to the rotational reference frame $v_{d,q,0}$ are controlled from the central controller and the controllers 613 inside units $G_{HFV}(s)$ deal with the output voltage transients, distortion, and higher harmonic contents.

The decoupling block 611 calculates decoupling currents $i_{d,q,0CAL}^*$ which provides the control of the system with reactive load($Z_L$ or $Z_{a,b,cL}$). The voltage controllers 613 calculate the reference currents necessary to maintain the output voltage with resistive loads, but in the case of reactive loads, they cannot provide sufficient reactive current reference. Adding the decoupling terms to the other current references provides additional reactive power reference. Finally, the reference current $i_{d,q,0}^*$ is obtained by summing the average reference current from the central control block $i_{d,q,0A}^*$, the high frequency component $i_{d,q,OHF}$ and the decoupling term $i_{d,q,0CAL}^*$. The block 612 $H_{CC}(s)$ represents the transfer function of the current controller and output filter.

Th open loop transfer function for n converters 61, 62 connected in parallel using the this method, including differences between the units, is given in (9).

$$\frac{v_o}{v_R^o - v_o} = G_{LFV}(s)\left[\frac{\sum_1^n H_{CC}^k(s)}{1 + \left(\sum_1^n H_{CC}^k(s)G_{HFV}^k(s)\right)Z_L}\right]Z_L \quad (9)$$

$$\frac{v_o}{v_R^o - v_o} = G_{LFV}(s)\left[\frac{nH_{CC}(s)}{1 + H_{CC}(s)G_{HFV}(s)Z_L}\right]Z_L \quad (10)$$

The expression (10) can be derived from the transfer function (9) if it is assumed that all modules are equivalent. The transfer unction is more complex than in other methods, but it allows different levels of control to be applied.

Control of the current sharing in the system is provided. The central control block sends information about the total average current demand to the converters. In the case where differently rated power converters are connected in parallel, each converter can calculate its own contribution to the output power (provided that information about the maximum power in the system is provided). The current-sharing can be controlled to remain equivalent in steady state and during transients.

If the control tasks are distributed in is way, then the paralleling of the converters can be achieved with low communication bandwidth allowing for remotely connected converters. In this control method, unbalances in the system are dealt with locally, and the average output voltage is maintained constant in the rotational reference frame.

Figure 7:
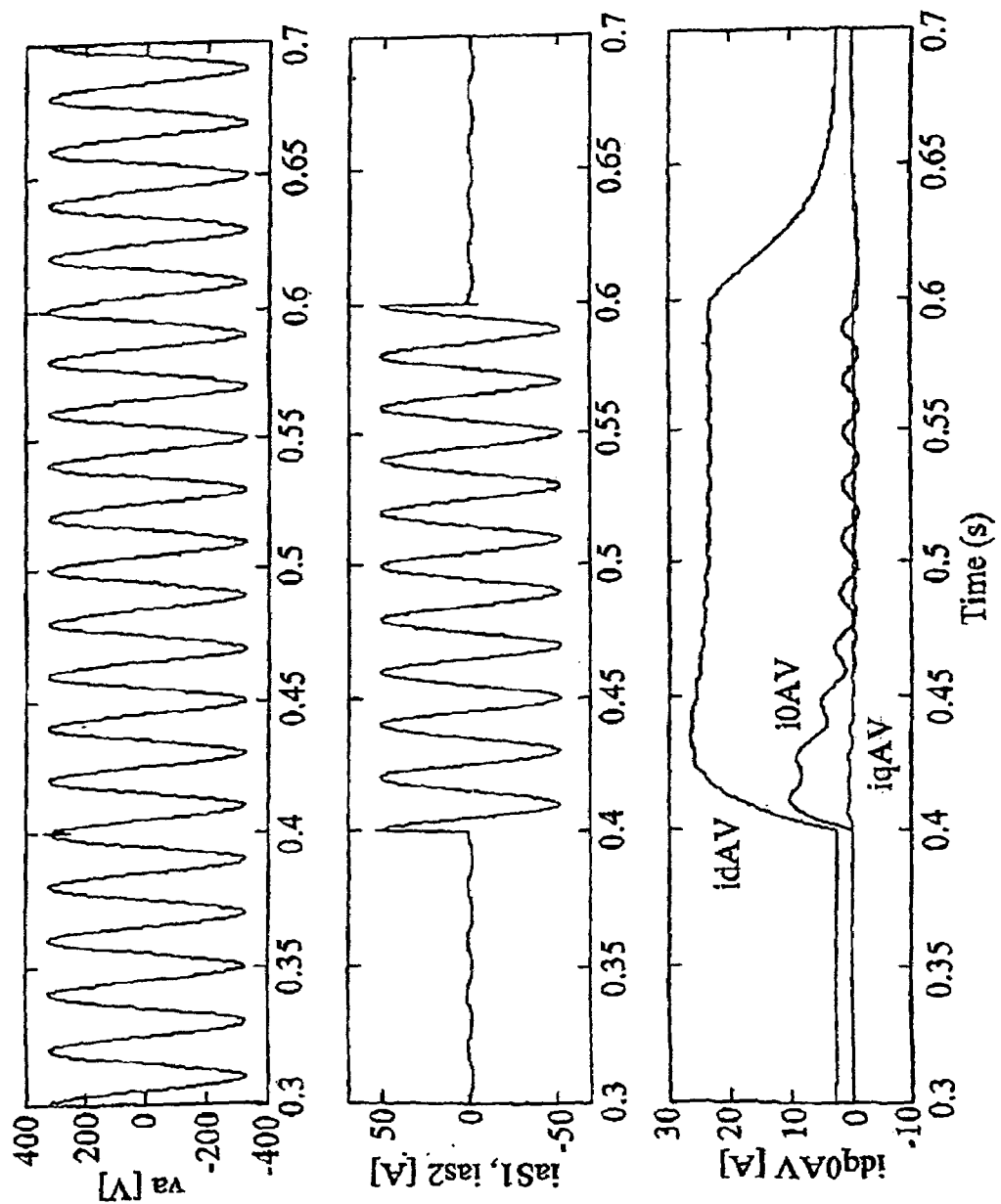
FIG. 7 shows the dynamic performance for a step load change of the system shown in FIG. 6.

A simulation of the system of the present invention and the three prior art systems described above was carried out using a three-phase model consisting of two power units connected in parallel. The nominal parameters of the inverter system were:

Inverter unit capacity 25 kVA
Output voltage 230 Vrms/50 Hz
DC voltage link 400V
Output filter inductance Ls=0.4 mH
Output filter capacitance Cs=28 µF
The following non-ideal conditions were used:
Voltage control loop bandwidth 500 Hz
Communication link bandwidth 5 kHz
Output filter inductance of 90% Ls for master unit and 110% Ls for slave unit
Constant phase difference between the control block and one unit of 2° in DCM method FIG. 7 shows the dynamic performances for a step load change from 3% to 100%. The output phase voltage $v_a$, output phase currents $i_{aS1}$ and $i_{aS2}$ and reference currents $i_{dAV}$, $i_{qAV}$ and $i_{0AV}$ shown in this Figure for the DCM method. The load step is applied to only one phase.

Figure 8:
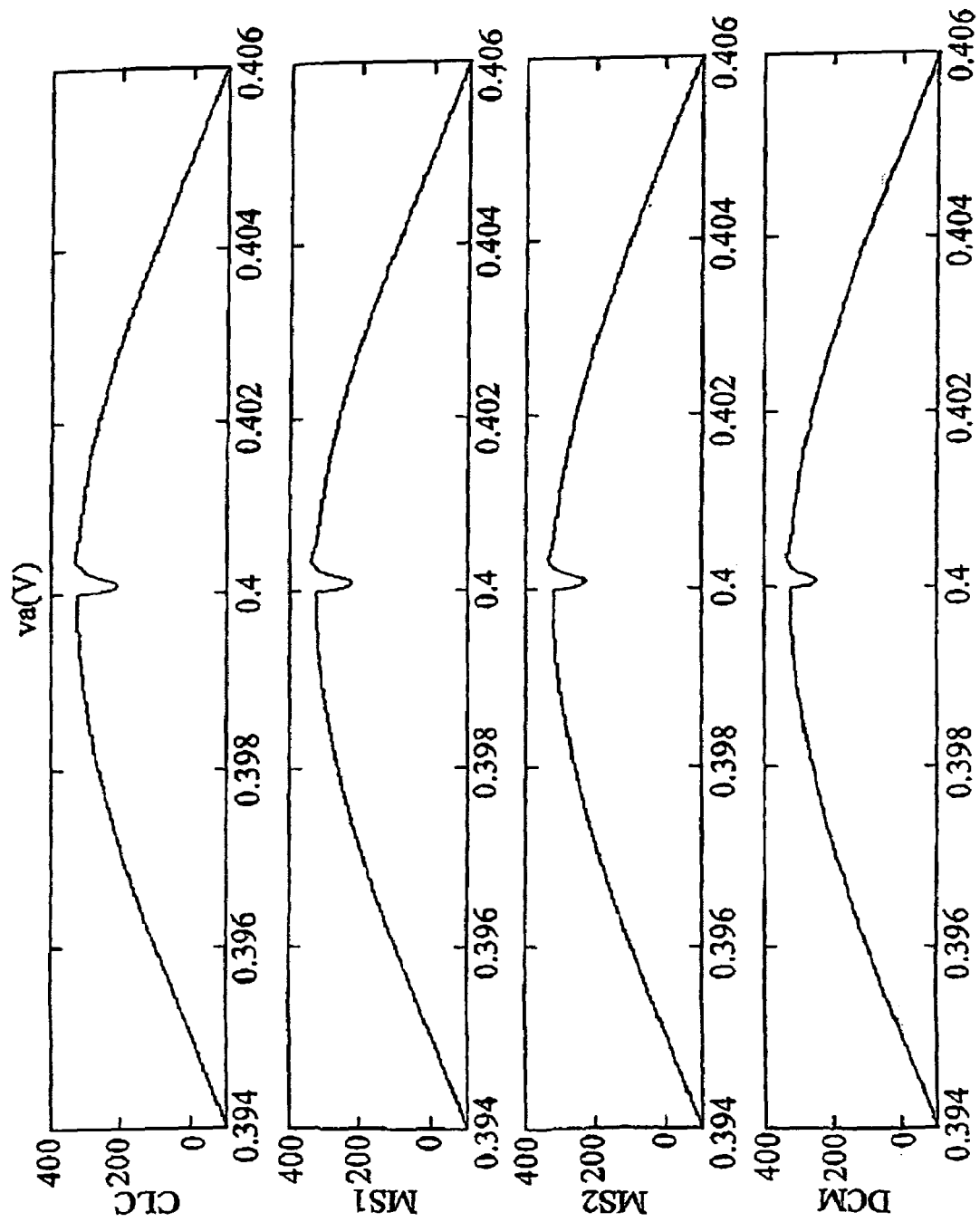
FIG. 8 shows a comparison of the output voltages during a step load change for the system shown in FIG. 6 and three prior systems.

FIG. 8 shows a comparison between transient phase voltage responses for a step load change from 3% to 100%.

Figure 9:
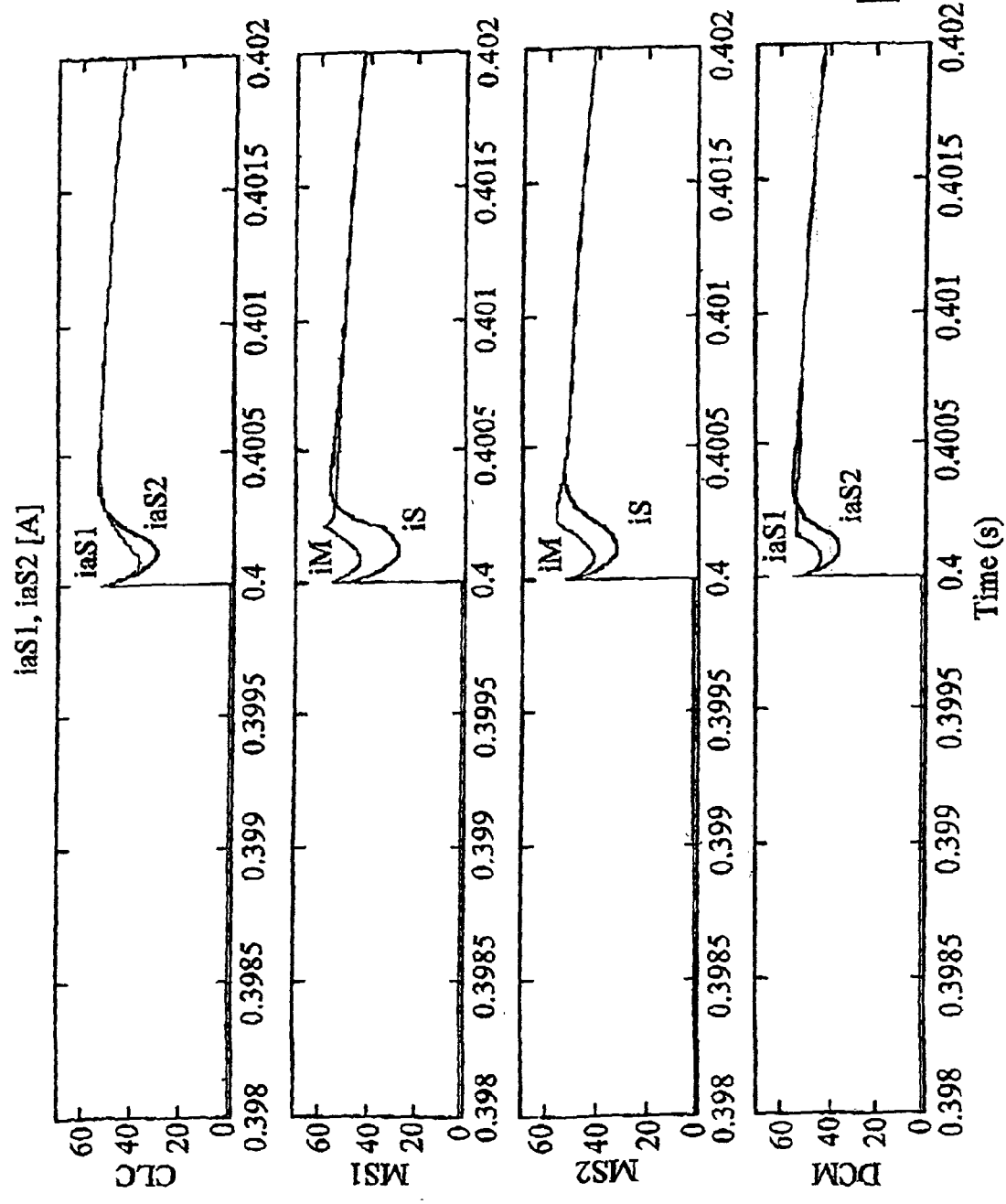
FIG. 9 shows a comparison of the output currents during a step load change for the system shown in FIG. 6 and three prior systems.

FIG. 9 shows transient phase current responses $i_{aS1}$ and $i_{aS2}$ (or $i_M$ or $i_S$) for a step load change from 3% to 100%.

The prior art methods show good results in steady state voltage control and current sharing. The transient current mismatch in FIG. 9 is due to the inductance mismatch in the output filters. The master-slave methods MS1 and MS2 have a different transient current sharing response, and the master units try to provide more current in order to keep voltage closer to the reference. On the other hand, in CLC and the distributed control method, the current sharing is forced all the time. However during transients, the difference between the output voltage and the reference in the CLC method can be larger. The high frequency voltage controller inside each unit in the distributed control method means that the voltage drop in this method is not very large. However, if the inverter units are remotely connected in parallel, the DCM shows better results, because it requires lower communication bandwidth.

The invention claimed is:

1. A control system for controlling a device comprising:
a low frequency controller; and
a high frequency controller;
wherein, in use, a feedback signal from the device being controlled is input to the low frequency controller to produce a first control signal;
the feedback signal is also fed to the high frequency controller to produce a second control signal;
the first and second control signals are combined to provide a main control signal for the device being controlled; and
the low frequency controller is located remotely from both the device being controlled and the high frequency controller.

2. A control system according to claim 1 wherein the feedback signal is passed through a filter before being fed to the low frequency controller.

3. A control system according to claim 2 wherein the filter is a low pass filter.

4. A control system according to claim 1, 2 or 3 wherein the feedback signal is subtracted from a reference signal before being input to the low frequency controller.

5. A control system according to claim 4 wherein the low frequency controller is responsive to low frequency components of the signal input to it.

6. A control system according to claim 4 wherein the high frequency controller is responsive to high frequency components of the signal input to it.

7. A control system according to claim 1 wherein the low frequency controller is a voltage controller.

8. A control system according to claim 1 wherein the high frequency controller is a voltage controller.

9. A control system according to claim 7 wherein the high frequency controller is a voltage controller and the main control signal is passed to a current controller for providing a drive current to the device being controlled.

10. A control system according to claim 9 wherein the feedback signal is a voltage signal produced by the device being controlled.

11. A power generation system comprising:
a main controller; and
one or more generator units for producing a regulated voltage output signal, each generator unit having a local controller associated with it,
wherein the main controller is located remotely from at least one of said one or more generator units controlled and from the local controller associated with the respective at least one of said one or more generator units controlled, and,
wherein, in use, the output signal is input to the main controller to produce a first control signal and the output signal is also input to the local controller in each of said generator units, to produce a second control signal; and wherein, in each of said generator units,
the first and second control signals are combined to provide a main control signal for controlling the respective generator units.

12. A power generation system according to claim 11 wherein the output signal is passed through a filter before being fed to the main controller.

13. A power generation system according to claim 12 wherein the filter is a low pass filter.

14. A power generation system according to claim 11, 12 or 13 wherein the output signal is subtracted from a reference signal before being input to the main controller.

15. A power generation system according to claim 14 wherein the main controller is responsive to low frequency components of the output signal input to it.

16. A power generation system according to claim 14 wherein the local controller is responsive to high frequency components of the output signal input to it.

17. A power generation system according to claim 14 wherein the output signal is sent to the main controller via a low bandwidth link.

18. A power generation system according to claim 17 wherein the output signal is converted to a low frequency signal prior to being sent to the main controller.

19. A power generation system according to claim 17 wherein the output signal is converted to a rotational reference signal prior to being sent to the main controller.

20. A power generation system according to claim 14 wherein the output signal is converted to a rotational reference signal prior to being sent to the local controller.

21. A power generation system comprising:
a control system according to any one of claims 1–3; and
at least one generator unit, wherein the device being controlled is the generator unit.

22. A method of controlling a power generation system comprising: inputting an output signal from a generator;
producing a first control signal based upon the output signal;
producing a second control signal based upon the output signal;
combining the first and second control signals to produce a main control signal;
controlling the generator using the main control signal; and wherein:
the first control signal is produced by a first controller which is remote from the generator and remote from a second controller used to generate said second control signal; and
the output signal is sent from the generator over a low frequency link to the controller.

23. A method according to claim 22 wherein the first control signal is determined based upon the low frequency components of the output signal.

24. A method according to claim 22 or 23 where the second control signal is determined based upon the high frequency components of the output signal.

25. A carrier medium carrying computer readable instructions for controlling a computer to carry out the method of claim 22.

* * * * *